Sept. 15, 1964 J. E. HARPER 3,148,984

PRESENSITIZED DIAZO LITHOGRAPHIC PRINTING PLATES COMPRISING A HYDROPHILIC PHOSPHATE GLASS AND FLUORIDE LAYER

Filed May 15, 1961

INVENTOR
JAMES E. HARPER

BY Fisher, Christen & Goodson

ATTORNEYS

United States Patent Office 3,148,984
Patented Sept. 15, 1964

3,148,984

PRESENSITIZED DIAZO LITHOGRAPHIC PRINTING PLATES COMPRISING A HYDROPHILIC PHOSPHATE GLASS AND FLUORIDE LAYER

James Earl Harper, 6040 Haverhill Drive, Washington, D.C.

Filed May 15, 1961, Ser. No. 110,035
18 Claims. (Cl. 96—75)

Figure 1:
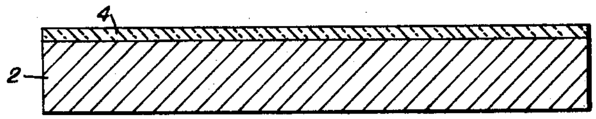

This invention relates to lithographic printing plates. More particularly it is concerned with the production of a pre-sensitized lithographic plate which can be stored for extended periods of time before being removed from a light-proof package, exposed through a negative mask or stencil, washed off and placed directly on a lithographic press. In particular, this invention is concerned with the production of a lithographic plate which does not break down when stored for extended periods of time under conditions of extreme variations in humidity and temperature.

This invention is principally concerned with the provision of a pre-sensitized lithographic plate formed from a thin metal sheet having at least one surface thereof treated to provide a tightly bonded, thin surface coating formed from a solution of an alkali metal phosphate and sodium fluoride or potassium hexafluotitanite and, alternately with the addition of an organic surfactant to the coating solution, and having a coating of a light-sensitive material over the glassed treated surface of the metallic sheet.

Various techniques of lithographic printing have long been known in the art. As early as 1796 it was discovered that a greasy image could first be delineated upon a smooth limestone surface with a crayon, dampened with a sponge, and then inked with a conventional ink roller. The dampened non-image areas readily repelled the ink while the grease receptive image accepted it. Paper sheets pressed against this stone so treated yielded prints. Stone lithography thus became widely known and practiced in all parts of the world.

It was soon discovered, however, that plates of metal, for example, aluminum, zinc, or copper, uniformly abraded to provide high water receptivity, provided a better media than the stone surface. The use of abraded metal plates rapidly and substantially replaced the use of the stone media.

Following the adoption of metal plates, new light-sensitive coatings were developed, for example, colloidal materials mixed with ammonium or potassium bichromate. This development ushered in the era of photo-lithography, that is, when a negative or stencil is held in close contact to the sensitive coating on the plate and exposed to a source of ultra-violet light, the image is transferred to the surface of the plate. From this process prints of the very highest quality result when the plates are run upon a lithographic press. Today, the so-called "offset" lithography technique is used substantially universally, i.e., where the image is first transferred to a rubber covered blanket roll and then "offset" to the paper.

In "offset" lithography, a light-sensitive colloidal material is first coated on the surface of the plate and dried. This coating process is known as "sensitizing." Plates prepared by this method suffer from one common and very important disadvantage and that is, if the plates are not exposed and developed immediately after sensitizing, a reaction occurs between the metallic surface and the light-sensitive coating which results in rapidly insolubilizing the entire coated area to the end that both the image and the non-image areas are made oleophilic and ink receptive. In warm, humid weather, this reaction often occurs so rapidly that it is virtually impossible to operate a lithographic "offset" press using such plates, however, despite the inadequacy of these plates, they were widely used and, in "deep-etch" form, are still widely used.

Many attempts have been made to produce a commercially usable pre-sensitized "offset" plate and especially after the discovery of fairly stable light-sensitive materials, for example, heavy molecular weight diazo formaldehyde resins. The heavy molecular weight diazo resins per se are far more stable under adverse storage conditions than, for example, the bichromated colloids; however, when coated directly on an unpassivated metal support, the diazo resins insolubilize themselves with even greater rapidity than do the bichromated colloids.

Various attempts have been made to prevent direct contact between the metal base and the light-sensitive material. One of the more successful methods was to "passivate" metallic sheets by immersing them in heated solutions of sodium silicate, depositing thereon a very thin, inert, and insoluble glassing layer. The thusly coated metal base was then coated with a light-sensitive diazo formaldehyde resin resulting in an "offset" plate of good printing quality; however, even though of good printing quality, the plates could not be stored except under carefully controlled conditions of temperature and humidity. If such plates are subjected to relatively severe conditions of heat and humidity as found in the more southern areas of the United States and the tropical areas of the hemisphere, the light-sensitive material breaks through the layer of silicate glass in areas which are at first very minute in size but which rapidly increase in size, rendering the plate unfit for use.

It has been theorized that the failure of the sodium silicates to provide an adequate barrier may be attributed to the fact that the sodium silicate particle is spherical in shape, thus permitting selective seepage of the light-sensitive material through the interstices of the piled silicate spheres into contact with the metal base.

Many suggestions have been made as to how to overcome the defects of the sodium silicate coatings. One of the suggestions being to use phosphate glasses in place of the silicate glass, however, use of phosphate glasses has not proved successful in that such glasses are much too friable to provide adequate passivation and, further, do not provide the desired degree of water insolubility.

It is an object of this invention to provide a pre-sensitized printing plate which can be stored for extended periods of time under the most severe climatic conditions of high temperatures and humidity without chemical breakdown or otherwise affecting the high quality of the plate. A further object is the provision of a glassing composition for application to a metal base which does not react with the light-sensitive material to be coated thereon. An additional object of this invention is to provide a new glassing composition for application to a metal base which maintains its glassing powers substantially permanently in storage for an extended length of time, under extreme ranges of climatic conditions.

It is also an object of this invention to provide a pre-sensitized lithographic plate of high dimensional stability. An important object of this invention is the provision of a pre-sensitized lithographic plate which substantially completely prevents any interaction between the light-sensitive coating and the metal base, especially where a "diazo type" light-sensitive material is used. Still another object is to provide a coating for the metal sheet which may be applied directly to the surface thereof as the metal comes from the rolling mill without the necessity of removing emulsified lubricants which are usually present on the sheets and which heretofore have had to be removed prior to further processing. Other objects and advantages of this invention will become readily apparent from reading the description hereinafter set out.

It was unexpectedly discovered that pre-sensitized lithographic plate which may be stored over extended periods of time under conditions of extreme variation in temperature and humidity, could be manufactured by coating a metal base with a solution comprising sodium phosphate glass and a fluoride selected from the group consisting of sodium fluoride and potassium hexafluotitanate followed by applying thereto a light-sensitive material. Alternately, an organic non-ionic wetting agent may be added to the solution and, while not being essential to the invention, offers the advantages of effecting a thinner and more uniform coating of the solution. Lithographic plates prepared in accordance with this invention have been stored for extended periods of time at temperatures in excess of 120° F. and a relative humidity of 70% and above without breakdown. Reference is made to Table 1 which shows a comparison of the storage stability of plates prepared in accordance with this invention and other plates known in the art.

TABLE 1.—ACCELERATED AGING TESTS ON VARIOUS TYPES OF LITHOGRAPHIC PLATES CONDUCTED AT 120° F. AND 70% RELATIVE HUMIDITY

| Lithographic plate tested: | Breakdown point measured in hours |
|---|---|
| Zinc sensitized with bichromated albumin | 2 |
| Aluminum sensitized with bichromated albumin | 2 |
| Zinc sensitized with diazo resin | 1 |
| Aluminum sensitized with diazo resin | 1 |
| Silicated aluminum sensitized with diazo resin | 48 |
| Lithographic plates prepared in accordance with this invention,[1] 96 plus. | |

[1] Tests discontinued at this point.

To better understand the construction of the presensitized plates of this invention reference is made to the drawings wherein:

FIGURE 1 is a cross-sectional view showing a metal sheet 2 having a thin film 4 of applicant's composition initimately bonded to one surface of the metal sheet 2.

Figure 2:
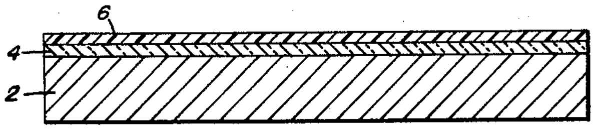
Figure 3:
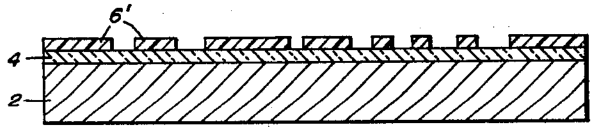

FIGURE 2 is a view in cross-section of a pre-sensitized lithographic plate prepared in accordance with this invention showing the coated metal base of FIGURE 1 having deposited thereon a thin coating 6 of a light-sensitive material.

FGIURE 3 is a view in cross-section of the pre-sensitized lithographic plate of FIGURE 2 after the plate has been exposed to a source of ultra-violet light through a photographic negative and then washed, leaving thereon the image as shown as 6'.

It is understood that the illustrations are not drawn to scale nor indicative of the thickness of the metal base, glassing coating, or light-sensitive coating, but, rather, are by way of illustration only.

In accordance with this invention a solution of a sodium phosphate glass and a fluoride selected from the group consisting of sodium fluoride and potassium hexafluotitanate is prepared and deposited as a coating on the surface of a metal plate.

While any metal may be used, for example, aluminum, zinc, copper, etc., aluminum is preferred. The plate may vary in thickness; however, plates having a thickness of from about .006 inch to .012 inch are quite satisfactory. The thickness used is dependent upon both the type of press on which the plate is to be employed and conditions attendant to the printing job being undertaken. A thin coating of a light-sensitive material is then deposited on the treated surface of the metal plate. The plates, if not slated for immediate use, may be packaged in a light-proof packaging material and placed in storage or shipped to printers in various areas of the country for use or storage. As stated hereinbefore, the plates prepared in accordance with this invention may be stored substantially indefinitely under conditions effecting extreme variations in temperature and humidity without impairing the quality of the plates or the extreme clarity in detail of the printed matter therefrom.

When the printer desires to use a plate, the plate is removed from the package under the proper subdued light conditions, placed in contact with a negative or stencil, and exposed to a source of ultra-violet light for the required period of time, dependent upon the intensity of the light source. After exposure, the surface of the plate is washed with water or a solution of dilute acidified gum arabic, whereby the unexposed light-sensitive material is removed, leaving the initial hydrophilic "glass" coating on the metal surface exposed in those areas. The plate is then placed on a lithographic press and used in accordance with conventional printing techniques.

The sodium fluoride and potassium hexafluotitanate used in the glassing composition of this invention are of the commercial grade and readily obtainable on the market. The phosphate glasses utilized in the glassing compositions herein are glasses and, like all glasses, are formed by cooling or solidifying a melt of proper composition. In the glassing composition of this invention, a sodium phosphate is used having a molecular ratio range of sodium to phosphorous (based on the oxide) of 1.0:1.0 to 1.8:1. While other phosphate glasses, having a wide variation in the mol ratio between sodium and phosphorous (based on the oxide), may be used to advantage in the composition of this invention, in the preferred embodiment a phosphate glass is used having a mol ratio range of sodium to phosphorus (based on the oxide) of 1:1. It has been found that these glasses maintain a high degree of molecular identity when dissolved in water and, in addition, show definite progressive continuity of structure with progressive change of composition. Because of infinte variation possibilities and the wide range of applicability, most of the producers of polyphosphate glasses manufacture standardized phosphate compositions. Such standardized compositions have been variously identified, for example, as sodium polyphos, sodium hexametaphosphate, sodium metaphosphate, and sodium hexaphos.

A wide range of non-ionic wetting agents may be used successfully in the glassing composition of this invention, for example, sodium lauryl sulfate, polyoxyethylated nonylphenols, and other wetting agents of like character. As mentioned hereinbefore, the presence of such wetting agents, while not being essential to the invention, are incorporated where a thinner coating is desired and, also, such wetting agents impart a greater degree of homogeneity to the solution.

The polyoxyethylated nonylphenols mentioned above have the following structure:

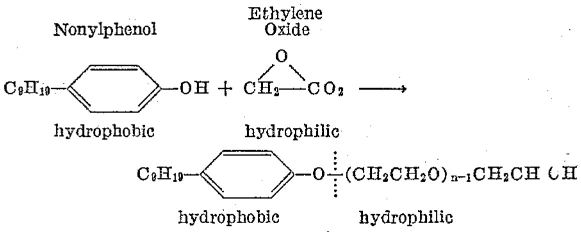

*n* denotes the number of mols of ethylene oxide per mol of nonylphenol.

The water solubility of polyoxyethylated nonylphenols is directly proportional to the number of ethylene oxide groups per mol of nonylphenol. When compounds of this type are used in the composition of this invention it is preferred that *n* have a value in the range of 9 to 30. It is to be understood, however, that other organic non-ionic wetting agents may be just as advantageously used in the "glassing" composition.

While various light-sensitive coatings may be used to advantage in the photolithographic plates of this invention, e.g., silver salts, polyvinylcinnamate and other light-sensitive polymers, the diazo type resin is preferred. This type of resin is readily available commercially, tans to extreme hardness in image areas when exposed to ultraviolet light and is readily removable in non-image areas with plain water or with weak acidified gum arabic solutions.

The following example is by way of illustration of the preparation of the "offset" lithographic plates of this invention and is not to be construed as limiting the invention.

*Example 1*

Aluminum foil or sheet material, ranging in a thickness of .006 to .012 inch, is used as a base material. The aluminum sheets used in the trade have been processed at the rolling mill with emulsified lubricants. Utilizing the coatings of this invention it is not necessary to remove such lubricants prior to further processing. When grained or abraded metal sheets are desired, the emulsified mill lubricants may be removed prior to graining. Removal of the lubricant is accomplished by immersing the sheet in the hot glassing solution for a period of three minutes at a temperature of approximately 190° F. The sheet is then rinsed through three successive water baths to effect a complete cleaning and removal of all traces of the unreacted glassing solution and saponified mill lubricants. Other methods known in the art for cleaning such lubricants from the metal plate may also be used.

In accordance with this invention, the aluminum sheet may be utilized with or without cleaning, abraded or grained. Printing plates having an abraded metal base often provide a superior press performance for the reason that it is much easier to maintain accurate water and ink balance on the press. Further, the number of impressions possible with plates having a grained metal base exceeds that of smooth based plates by a factor of two to three times. It is to be understood, however, that, whether or not the base is smooth or grained, does not affect the quality of the prints produced from the pre-sensitized lithographic plates prepared in accordance with this invention nor the stability of the plates in storage under conditions of extreme variations in temperature and humidity.

The base metal sheet (grained or in the smooth condition) is then immersed for three minutes in a solution of the glassing composition. The solution is held at a temperature of about 190° to 200° F.

Set out below by way of example are formulations illustrative of the glassing compositions of this invention. It is emphasized that, while the ratio of the individual components is relatively unimportant, it is essential that the composition comprise a sodium phosphate glass and a fluoride selected from the group consisting of sodium fluoride and potassium hexafluotitanate:

FORMULA 1

| | | |
|---|---|---|
| Sodium phosphate glass $(NaPO_3)_n$ [1] | g. | 5.0 |
| Sodium fluoride (NaF) | g. | 1.0 |
| Sodium lauryl sulfate $(NaC_{12}H_{25}SO_4)$ [2 3] | g. | 0.5 |
| Water | cc. | 100 |

FORMULA 2

| | | |
|---|---|---|
| Sodium phosphate glass $(NaPO_3)_n$ [1] | g. | 5.0 |
| Sodium fluoride (NaF) | g. | 1.0 |
| Polyoxyethylated nonylphenol [2 3] | g. | 0.5 |
| Water | cc. | 100 |

FORMULA 3

| | | |
|---|---|---|
| Sodium phosphate glass $(NaPO_3)_n$ [1] | g. | 5.0 |
| Sodium fluoride (NaF) | g. | 1.0 |
| Polyoxyethylated nonylphenol [2 3] | g. | 0.5 |
| Water | cc. | 100 |

FORMULA 4

| | | |
|---|---|---|
| Sodium phosphate glass $(NaPO_3)_n$ [1] | g. | 5.0 |
| Potassium hexafluotitanate $(K_2TiF_6)$ | g. | 1.0 |
| Sodium lauryl sulfate $(NaC_{12}H_{25}SO_4)$ [2 3] | g. | 0.5 |
| Water | cc. | 100 |

FORMULA 5

| | | |
|---|---|---|
| Sodium phosphate glass $(NaPO_3)_n$ [1] | g. | 5.0 |
| Potassium hexafluotitanate $(K_2TiF_6)$ | g. | 1.0 |
| Polyoxyethylated nonylphenol [2 3] | g. | 0.5 |
| Water | cc. | 100 |

FORMULA 6

| | | |
|---|---|---|
| Sodium phosphate glass $(NaPO_3)_n$ [1] | g. | 5.0 |
| Potassium hexafluotitanate $(K_2TiF_6)$ | g. | 1.0 |
| Polyoxyethylated nonylphenol [2 3] | g. | 0.5 |
| Water | cc. | 100 |

[1] "*n*" equals an average of 15.
[2] Wherein there are 9 to 30 mols of ethylene oxide per mol of nonylphenol.
[3] Optional.

The surface imparted to the thusly treated aluminum sheet is a thin, hard, non-oxidizable, insoluble, permanent, hydrophilic coating of a chemically formed glass. Unlike the silicate glasses heretofore used in the art, the coating completely prevents "pinholing" resulting from seepage of the light-sensitive material through the glassed coating.

The plate is next sensitized with a light-sensitive material. While many light-sensitive materials may be used in the preparation of the plates in this invention, it is preferred to use a light-sensitive diazo resin. Suitable light-sensitive diazo resins such as a diazo formaldehyde resin, are available commercially from several manufacturers. When a diazo resin is used, a dilute solution of approximately 1% to 3% is deposited on the glassed surface of the plate. If an ungrained metal sheet is employed, the more dilute solution of the resin is used. Excess coating is wrung off the plate between two rubber rolls. Care must be employed at this stage of preparation to avoid partial exposure of the thin light-sensitive coating to extraneous light sources.

As mentioned hereinbefore, the exposed image developed from plates having a smooth metal base has a relatively short press life, and, in order to increase the press life, the plate may be reinforced by a surface lacquer, e.g., an emulsified pigmented epoxy or vinyl resin which dries to a hard protective film in the image areas.

Where a grained metal base plate has been used, the glassed surface is light-sensitized with a more concentrated solution of the diazo resin with the result that the coating formed is relatively thicker than that formed when a smooth metal base has been used. Excessive coating may be removed by the use of an air doctoring device. Light-sensitive plates prepared on grained plates require no lacquering treatment for long press runs and are not prone to be easily light struck.

While preferred embodiments of the invention have been shown, it is to be understood that changes and variations may be made without departing from the spirit and scope of the invention as defined by the appended claims.

I claim:

1. A stable pre-sensitized photolithographic printing plate capable of being stored in light-proof packages substantially indefinitely under conditions of extreme variations in temperature and humidity without affecting the quality of said plates, comprising a base metal sheet having deposited on at least one surface thereof an initial hydrophilic coating formed from a solution comprising as the sole constituents to render said base metal sheet surface hydrophilic an alkali metal phosphate glass, and a fluoride selected from the group consisting of sodium fluoride and potassium hexafluotitanate and, a non-ionic organic wetting agent which provides a thin uniform coating of an aqueous soluble and a coating of light-sensitive diazo resin overlying said hydrophilic coating, said light sensitive diazo resin being such that, when the plate is exposed to a source of ultra-violet light through a negative or a stencil, the exposed portion of said light-sensitive diazo resin will react to provide a tanned, insoluble image, the unexposed portions of the light-sensitive diazo resin being capable of being washed away, thereby uncovering the initial coating under said unexposed portions.

2. The stable pre-sensitized photolithographic printing plate of claim 1 wherein the organic non-ionic wetting agent is selected from the group consisting of sodium lauryl sulfate and a polyoxyethylated nonylphenol having 9 to 30 ethylene oxide groups per mol of nonylphenol.

3. The stable pre-sensitized photolithographic printing plate of claim 1 wherein the organic non-ionic wetting agent is sodium lauryl sulfate.

4. The stable pre-sensitized photolithographic printing plate of claim 1 wherein said fluoride is sodium fluoride.

5. The stable pre-sensitized photolithographic printing plate of claim 1 wherein said fluoride is potassium hexafluotitanate.

6. The stable pre-sensitized photolithographic printing plate of claim 1 wherein said base metal sheet is aluminum.

7. The stable pre-sensitized photolithographic printing plate of claim 1 wherein said alkali metal phosphate glass is a sodium phosphate having the formula $(NaPO_3)_n$ wherein $n$ is about 15.

8. A stable pre-sensitized photolithographic printing plate capable of being stored in a light-proof package, substantially indefinitely under conditions of extreme variations in temperature and humidity without affecting the quality of said plates, comprising a base sheet of a metal selected from the group consisting of aluminum, zinc and copper, having deposited on at least one surface thereof, an initial hydrophilic coating formed from a solution comprising as the sole constituents to render said base metal sheet surface hydrophilic sodium phosphate and sodium fluoride, and a coating of an aqueous soluble light-sensitive diazo resin overlying said hydrophilic coating, said light-sensitive diazo resin being such that, when the plate is exposed to a source of ultra-violet light through a negative or a stencil, the exposed portions of said light sensitive diazo resin will react to provide a tanned, insoluble image, the unexposed portions of the light-sensitive diazo resin being capable of being washed away, thereby uncovering under said unexposed portions the initial coating exposed in those areas.

9. The stable pre-sensitized photolithographic printing plate of claim 8 wherein said base sheet of a metal is aluminum.

10. The stable pre-sensitized photolithographic printing plate of claim 8 wherein said sodium phosphate has the formula $(NaPO_3)_n$ wherein $n$ is about 15.

11. A stable pre-sensitized photolithographic printing plate capable of being stored in a light-proof package substantially indefinitely under conditions of extreme variations in temperature and humidity without affecting the quality of said plates, comprising a base sheet of a metal selected from the group consisting of aluminum, zinc and copper, having deposited on at least one surface thereof, an initial hydrophilic coating formed from a solution comprising as the sole constituents to render said base metal sheet surface hydrophilic sodium phosphate, potassium hexafluotitanate and sodium lauryl sulfate which provides a thin uniform coating, and a coating of an aqueous soluble light-sensitive diazo resin overlying said hydrophilic coating, said light-sensitive diazo resin being such that, when the plate is exposed to a source of ultra-violet light through a negative or stencil, the exposed portions of said light sensitive diazo resin will react to provide a tanned, insoluble image, the unexposed portions of the light-sensitive diazo resin being capable of being washed away, thereby uncovering the initial coating under said unexposed portions.

12. The stable pre-sensitized photolithographic printing plate of claim 11 wherein said base sheet of a metal is aluminum.

13. The stable pre-sensitized photolithographic printing plate of claim 11 wherein said sodium phosphate has the formula $(NaPO_3)_n$ wherein $n$ is about 15.

14. A stable pre-sensitized photolithographic printing plate capable of being stored in a light-proof package substantially indefinitely under conditions of extreme variations in temperature and humidity without affecting the quality of said plates, comprising a base sheet of aluminum having deposited on at least one surface thereof an initial hydrophilic coating formed from an aqueous solution comprising as the sole constituents to render said base metal sheet surface hydrophilic a sodium phosphate and a fluoride compound selected from the group consisting of sodium fluoride and potassium hexafluotitanate and a coating of an aqueous soluble light-sensitive diazo resin overlying said initial hydrophilic coating, said diazo resin material being such that, when the plate is exposed to a source of ultra-violet light through a negative or stencil, the exposed portions of said light-sensitive diazo resin will react to provide a tanned, insoluble image, the unexposed portions of the light-sensitive diazo resin being capable of being washed away thereby uncovering the initial coating under said unexposed portions.

15. The stable pre-sensitized photolithographic plate of claim 14 wherein said fluoride compound is sodium fluoride.

16. The stable pre-sensitized photolithographic plate of claim 14 wherein said fluoride compound is potassium hexafluotitanate.

17. The stable pre-sensitized photolithographic plate of claim 14 wherein said sodium phosphate has the formula $(NaPO_3)_n$ wherein $n$ equals an average of 15.

18. A stable pre-sensitized photolithographic printing plate capable of being stored in light-proof packages substantially indefinitely under conditions of extreme variations in temperature and humidity without affecting the quality of said plates, comprising a base metal sheet having deposited on at least one surface thereof an initial hydrophilic coating formed from a solution comprising as the sole constituents to render said base metal sheet surface hydrophilic an alkali metal phosphate glass and a fluoride selected from the group consisting of sodium fluoride and potassium hexafluotitanate and a coating of an aqueous soluble light-sensitive diazo resin overlying said hydrophilic coating, said light sensitive diazo resin being such that, when the plate is exposed to a source of ultra-violet light through a negative or a stencil, the exposed portion of said light sensitive diazo resin will react to provide a tanned, insoluble image, the unexposed portions of the light-sensitive diazo resin being capable of being washed away, thereby uncovering the initial coating under said unexposed portions.

References Cited in the file of this patent

UNITED STATES PATENTS

| | | |
|---|---|---|
| 1,964,358 | Krieger | June 26, 1934 |
| 2,507,314 | Mason | May 9, 1950 |
| 2,946,683 | Mellan et al. | July 26, 1960 |
| 2,990,610 | Luckerath et al. | July 4, 1961 |
| 3,030,210 | Chebiniak | Apr. 17, 1962 |